April 7, 1964

J. V. R. HELITAS 3,127,647

FOUNTAIN PEN CAP FASTENING DEVICE

Filed June 18, 1962

United States Patent Office 3,127,647
Patented Apr. 7, 1964

3,127,647
FOUNTAIN PEN CAP FASTENING DEVICE
Jules Victor Robert Helitas, Asnieres, France, assignor to A. J. Fagard & Cie, Paris, France, a corporation of France
Filed June 18, 1962, Ser. No. 203,184
Claims priority, application France July 28, 1961
5 Claims. (Cl. 24—11)

The present invention relates to fastening devices for fountain-pen caps.

An object of the invention is to provide a fastening device which can easily and rapidly be fitted on a fountain-pen cap.

Another object of the invention is to provide a device of this kind which, if so required, can readily be detached from the cap.

Yet another object of the invention is to provide a device of this type which is both simple and economical to manufacture and convenient to use, and which does not impose any limitation from the point of view of decoration both of the cap and of the fountain-pen body.

Again another object of the invention is to provide a device of this type which is not liable to cause any damage to the cap.

The device in accordance with the invention is characterized in that, on the one hand, the cap has an opening such as a window while, on the other hand, the fastening clip is provided at the top portion thereof with two resilient lugs which are formed substantially at right angles to the clip and which move closer together when they are urged through the window which is formed in the cap body so as to subsequently move apart due to resiliency when the said lugs reach the interior of the cap and thus lock the fastening clip in the assembled position, the said clip then covering the window or the like in a perfect manner.

The invention will be readily understood from the following description of one form of embodiment which has been chosen by way of example without implied limitation and which is given with reference to the accompanying drawing, in which.

Figure 1:
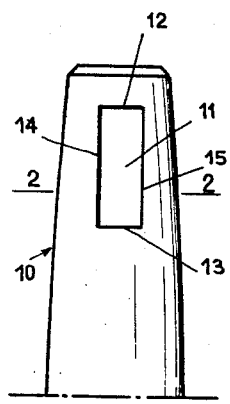
FIG. 1 is a view of a fountain-pen cap provided with the window which is designed to permit the insertion of the fastening device in accordance with the invention.
Figure 3:
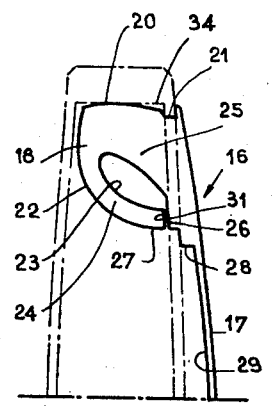
FIG. 3 is a side view of the fastening device, the cap having been shown in chain-dotted lines.

The fountain-pen cap 10, which can be of plastic material or of metal if so desired is provided, in the vicinity of the top portion of the side wall said cap as shown in the figure, with a rectangular window 11 which is limited by a top edge 12, a bottom edge 13 and two sides 14 and 15.

The fastening device 16 comprises, in addition to the fastening clip 17 proper, two lugs 18 and 18' formed simply by cutting-out and bending. A recess or notch 21 is formed in the top edge 20 of one lug close to the point of junction of the said top edge with the clip 17. There is joined to the said top edge 20 a curvilinear edge 22 which forms with a cut-out portion 23 a tongue 24, while the said cut-out portion 23, which is almost closed, forms a cheek 25. The cut-out portion 23 is continued in that portion which is adjacent to the cheek 25 by a notch 26 which substantially extends the extremity 27 of the contour 22, then by a step 28 which is joined to the edge 29 of the clip 17.

Figure 4:
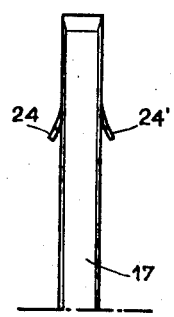
FIG. 4 is a front view of the said device.
Figure 5:
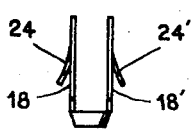
FIG. 5 is a corresponding top view.
Figure 6:
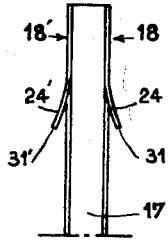
FIG. 6 is a view looking from the rear.

The tongue 24 of the lug 18 and the tongue 24' of the lug 18' are bent apart near their ends with respect to the longitudinal central plane of the clip, as is clearly shown in FIGS. 4 to 6.

Figure 7:
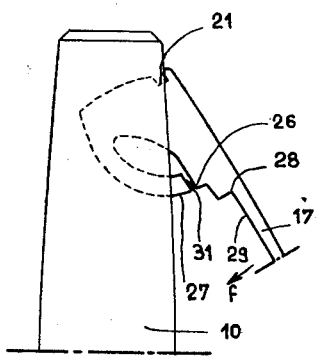
FIG. 7 is a view in side elevation of the cap and fastening device, this latter being shown during the assembly thereof.
Figure 2:
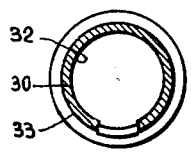
FIG. 2 is a view in cross-section taken along the line 2—2 of FIG. 1.

The assembly of the fastening device is carried out as follows:

The top portion of the fastening device is presented in front of the window 11 and is inserted therein at a slightly oblique angle with respect to the cap in such manner as to cause the notch 21 to co-operate with the top edge 12 of the window, as shown in FIG. 7. The insertion of the said fastening clip is effected without difficulty, by virtue of the fact that the distance between the outer faces of the lugs 18 and 18' in the non-cambered portions thereof is less than the distance between the sides 14 and 15 of the window. The fastening device is then caused to pivot as a result of the co-operation between the bottom of the notch 21 and the top edge 12 of the said window in the direction of the arrow $f$. During this pivotal movement, the lower portions of the sides 14 and 15 of the window co-operate with the bent-back tongues 24 and 24' which are progressively drawn together, the lugs thus penetrating into the interior of the cap. As soon as the free ends of the tongues 24, 24' have passed through the wall 30 which constitutes the cap, the said free ends open out by trip-release action the edges 31 and 31' of the said ends are abuttingly applied against the inner face 32 of the wall 30, thereby rigidly locking the fastening device in position, the outer wall 33 of the cap being then in abutting contact with the vertical portion of the step 28. The top edges 20 of the fastening device are in abutment with the underface of the cap bottom 34. The fastening device is thus in the fully locked position.

If for any particular reason it is desired to detach the fastening device from the cap, it is merely necessary to draw the two tongues together inside the cap, for example by inserting inside this latter a tool which is designed for the purpose, thereby permitting the said fastening device to pass between the sides 14 and 15 of the window by imparting to the said device a movement which is the reverse of that described above with reference to the fitting operation.

In an alternative form, the fastening device can be inserted through two slots formed in the cap at a distance apart which corresponds to that of the lugs of the device.

If so required, means can be provided for contributing to the tightness of the chamber formed by the cap as a housing for the nib when the fountain-pen is in the condition of closure.

What is claimed is:

1. A fountain-pen cap and fastening device comprising a cap with side wall and bottom, an opening being provided in said side wall in the vicinity of the bottom of said cap, a clip comprising a clip body and two lugs directed transversely to said body and adapted to be inserted elastically through said opening and to open out after passing through the cap wall so as to lock said clip in position with respect to said cap, said lugs having a height sufficient to cause said lugs to be in contact with the bottom of said cap after the lugs have been inserted inside the cap.

2. In combination for a writing instrument, a cap and a clip secured to said cap: said cap having an axis and being hollow and provided with a rectangular opening having axially extending longer sides and transversely extending shorter sides, said clip including a clip body having a notch accommodating the portion of the cap bounding one of the transverse sides of the opening, said clip including a pair of transversely spaced lugs each comprising a cheek connected to the clip body and a tongue extending freely from the cheek along a curved path which is in part transverse and outward of the cheek such that the distance between the tongues of the lugs is greater than the distance between the longer sides of the opening in the cap, said tongues being resilient and adapted for being compressed in a direction towards one another by the cap at the sides of the opening as the clip is pivotally moved about the cap at said one transverse side of the opening, with the latter accommodated in said notch, to cause said lugs to be inserted within the cap, said lugs being accommodated within said cap with an upper edge of the lugs in contact with the cap and with the tongues of the lugs freely released and in contact with the cap.

3. The combination as in claim 2 wherein said cap has a circular cross-section and said lugs are of C-shape and extend a distance in a transverse direction which is substantially greater than the radius of said cap whereby the lugs are immediately proximate the cap at a location diametrically opposite the opening in the cap.

4. A fountain-pen cap and fastening device comprising a cap having a side wall and bottom, said cap being provided with a longitudinal opening of rectangular outline close to said bottom, a fountain-pen clip comprising a clip body and two lugs directed transversely with respect to said body and forming a loop from the point of junction of said lugs with said clip body, said lugs having outer ends which are located at a distance from said body and which diverge elastically so as to move closer together at the time of insertion of the lugs through said longitudinal opening and to open out again when said outer ends have been passed inside said side wall so as to lock said clip in position with respect to said cap, a notch being provided at the point of junction of the lugs with the clip body for the purpose of assisting the fixation of the clip with respect to the cap, said lugs having a height sufficient to cause said lugs to be in contact with the bottom of said cap after the lugs have been inserted inside the cap.

5. A writing instrument cap, and fastening device comprising a cap having a side wall and bottom, said cap being provided in the side wall with a rectangular opening having long sides extending parallel to the axis of the cap, a resilient clip comprising a clip body and two lugs depending from said body and extending transverse to said body, each of the two lugs having a portion distant from said body over a distance which is greater than the radius of the cap, and a portion which comes close to said body and terminating in ends that are remote from each other, the distance between the outer faces of the lugs being less than the distance between the two long sides of the rectangular opening, except for said portion of the lugs which is distant from said body, each lug having a contour provided with a rectangularly shaped notch adapted to cooperate with the wall portion of the cap which bounds the smaller side of the rectangular opening, the lug having a height such that, with said notch accommodating the cap at said smaller side of the rectangle, the lug is in contact with the bottom of the cap.

References Cited in the file of this patent

UNITED STATES PATENTS

| 1,111,501 | Scheible | Sept. 22, 1914 |
| 1,594,410 | Fischer et al. | Aug. 3, 1926 |
| 1,737,375 | King | Nov. 26, 1929 |
| 1,762,793 | Oxx | June 10, 1930 |
| 1,904,212 | Esterow | Apr. 18, 1933 |
| 2,063,827 | Place | Dec. 8, 1936 |
| 2,681,487 | Poupitch | June 22, 1954 |

FOREIGN PATENTS

| 790,101 | Great Britain | Feb. 5, 1958 |
| 810,880 | Great Britain | Mar. 25, 1959 |
| 887,816 | Great Britain | Jan. 24, 1962 |
| 1,234,649 | France | May 16, 1960 |